United States Patent Office 2,904,484
Patented Sept. 15, 1959

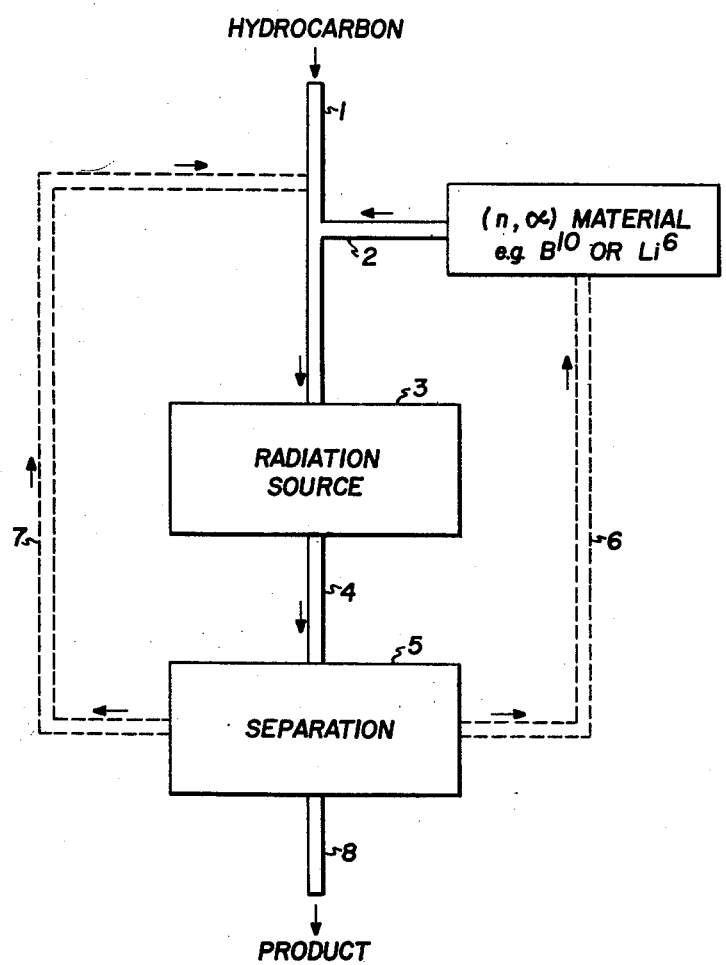
Robert W. Houston
Robert B. Long    Inventors
Barry L. Tarmy
By L. A. Strimbeck  Attorney

2,904,484
RADIOCHEMICAL REACTIONS

Robert W. Houston, Durham, N.H., and Barry L. Tarmy, Cranford, and Robert B. Long, Wanamassa, N.J., assignors to Esso Research and Engineering Company, a corporation of Delaware Application June 21, 1956, Serial No. 592,881

8 Claims. (Cl. 204—154)

This invention relates to radiochemistry and more particularly relates to an improved method for effecting hydrocarbon radiochemical reactions by subjecting a fluid material to high intensity ionizing radiation comprising neutrons, in the presence of materials existing as solutes that produce, upon neutron capture, alpha particles of high kinetic energy.

This application is a continuation-in-part of "Improved Radiochemical Reactions," Serial No. 547,834, filed November 18, 1955, by two of the present inventors.

It has been discovered that a number of desirable reactions can be carried out by subjecting materials to high intensity ionizing radiation such as beta rays, gamma rays and neutrons. The use of radiation to effect these reactions affords a number of substantial advantages over conventional prior art chemical processing techniques.

This invention proposes an improved method for inducing and controlling radiochemical reactions. This method comprises irradiating reactant materials, particularly hydrocarbons, with neutrons in the presence of accelerating materials existing as solutes that capture neutrons and emit highly ionizing alpha particles. It has been found that the presence of such an accelerating material, here called an (n,α) material for convenience, when existing as a solute in a solution that is admixed with a reactant, profoundly promotes radiochemical conversion of the reactant. According to the present invention, the time requirements for effecting radiochemical reactions are substantially reduced. The present invention is particularly applicable to hydrocarbon conversion processes carried out in a nuclear reactor.

The (n,α) materials used according to this invention are those materials that upon capture of a neutron, usually one having an energy below 100 ev., produce alpha particles of high kinetic energy, preferably greater than 0.1 mev., which have tracks of high ion density. Of primary interest are boron 10 and lithium 6, although other materials can be used such as Fe, $O^{17}$, $Zn^{67}$. The accelerating materials used have a high neutron capture cross-section so that an appreciable rate of alpha emission is achieved. The cross-section of the (n,α) material used is preferably above 100 Barns. Preferably, a sufficient amount of the (n,α) material is used to account for over 10% of the energy absorbed by the reactant.

While broadly these (n,α) materials have similar properties, they also have individual diffierences that can cause different results, particularly with specific reactions. For example, the higher neutron capture cross-section of boron 10, its lower alpha energy, and the different recoil particles, as compared to lithium 6, often causes it to give different results from lithium 6. Boron 10 and lithium 6, when existing as solutes as developed below, have in common, however, the ability to greatly accelerate neutron irradiated reactions.

When the term "boron" is employed in this specification, it is intended to mean naturally-occurring boron. However, the novel results of the present invention are due to an interaction between neutrons and the isotope $boron^{10}$, which isotope is present in naturally-occurring boron to the extent of about 19 weight percent. When the term "lithium" is used, it is intended to mean naturally-occurring lithium, which contains $Li^6$ to the extent of about 8.0 weight percent, which reacts $Li^6$ (n,α) $H^3$. Concentrates of these isotopes can, of course, be used.

The (n,α) materials are in the form of compounds existing as solutes in a suitable solvent. It has been found that by using the (n,α) materials as solutes, surprising results are obtained, even over the use of such materials or compounds thereof, as a finely divided solids in the reactants, or distended or carried on another solid.

Specific compounds of boron which are useful in this invention include: alkyl and aryl borates such as tri-n-dodecyl borate, tri-methylamyl borate, triphenyl borate, and tri-cresyl borate; inorganic borates and boric acid; boron halides such as $BF_3$ or $BCl_3$; boranes, $B_2O_3$, and borax.

Specific compounds of lithium which are useful include: $LiNO_3$, $Li_2O$, LiH, Amblygonite [Li(Al,F)$PO_4$] Cookeite [(HO)$_6$LiN$_3$Si$_2$O$_6$]LiF, Cryolithionite

[3NaF.3LiF.2NF$_3$]

Lithiophilite [LiMmPO$_4$]LiCl, Zinnwaldite (Li—Fe mica) $LiHCO_3$, Lithium aluminohydride (soluble in diethyl ether), $LiAlO_2$, Li Acetate, $LiCH_3$, $LiC_2H_5$ and $LiC_3$.

Compounds such as Lithium metaborate and tetraborate can be used.

Any suitable solvent can be used. For example, water and/or organic solvents such as ethers, alcohols, chlorinated solvents, amines, acids, ketones, and aldehydes, can be used. In some cases, particularly with hydrocarbon reactants, the reactant material can serve as the solvent. In using an oil-soluble compound during hydrocarbon conversions, intimate distribution of the (n,α) material is obtained. In some cases, compounds of the (n,α) material can be used that are particularly soluble in a specific solvent so as to permit ready recovery. For example, when converting petroleum oils, the (n,α) compound used can be soluble in a part of the reactant, so as to permit recovery of a portion of the product free from the (n,α) material.

The use of oil-insoluble forms is advantageous in that the insoluble compounds can be readily separated from the reaction products. Thus, a water solution of a (n,α) compound can be emulsified with a hydrocarbon reactant, say a gas oil. The admixture can then be irradiated, and the products separated by settling.

A suitable solid, liqiud, or gaseous conversion catalyst can be used in the reaction mixture. It is particularly preferred in some hydrocarbon conversions, such as the reforming of naphtha or the cracking of gas oils, to use finely divided solid catalysts such as alumina, silica alumina, platinum or molybdenum on alumina, etc. In some cases, simple inerts such as crushed refractory silica gel or charcoal can be suspended in the reactants.

The present invention is generally applicable to radiochemical reactions carried out by radiating materials with neutrons. Usually this can be most conveniently carried out, particularly on a commercial scale, by employing a nuclear reactor. The use of this particular source of radiation can be either on a batch or continuous basis. More specifically, for example, a batch reaction can be carried out simply by placing the material to be irradiated in a container and exposing this to the neutron radiation. To carry out a continuous process, the material to be irradiated can be simply pumped through the reactor itself or through pipes disposed in the reactor.

The radiation from the atomic pile consists primarily of neutrons and gamma rays. It is preferred that the neutron flux in the reaction zone be above $10^{11}$ neutrons/cm.$^2$/sec. The present process is most effectively carried out employing slow neutrons, that is, neutrons having an energy less than about 100 electron volts. Preferably, the majority of the neutrons are slow neutrons. Moderators such as carbon, light or heavy water, or hydrocarbons, can be employed, if desired, to obtain the desired proportion of slow neutrons. The feed stock being irradiated can itself serve as a moderator.

This invention is applicable to a wide range of hydrocarbon feed stocks including shale and shale oils, tar sands and tar sand oils, asphalts, synthetic oils, and natural and artificial hydrocarbon gases. It is particularly useful in the conversion of petroleum oils. For example, petroleum gas oils such as those boiling within the range of about 450° to 1200° F., usually about 500° to 1000° F., are more effectively irradiated in accordance with the present invention by employing (n,α) materials in solutions admixed with gas oils. In a like manner, methane and heavier gases including unsaturates, petroleum naphthas such as those boiling between about 80° and 450° F. and petroleum residua boiling above about 1200° F. are more effectively irradiated by the method of the present invention.

Depending upon the particular reaction conditions selected, the radiation of these petroleum oils can be carried out to obtain contaminate removal (especially metals), dehydrogenation, polymerization, desulfurization, cracking, alkylation, isomerization, and/or aromatization of the petroleum oils. It will be understood, however, that although the present invention is particularly applicable in the petroleum field, it can be employed in other radiochemical reactions such as, for example (1) polymerization of non-hydrocarbon monomers such as methylmethacrylate, vinyl chloride, vinyl alcohols, diamines, and dibasic acids; (2) controlled oxidation of organic materials to form alcohols, acids, aldehydes, ketones, epoxides, and the like; (3) aromatic substitution by direct processes such as direct nitration of aromatics with $NO_2$, or direct substitution with $NH_3$ to form aromatic amines, and (4) halogenation of organic compounds.

The use of solutes of (n,α) materials in accordance with the present invention is applicable to radiochemical reactions carried out employing a wide range of reaction conditions. In certain instances, the incorporation of (n,α) materials in the reaction mixture effects radiochemical reactions which otherwise proceed only with extreme difficulty, if at all. Generally, substantially lower temperatures, more favorable to certain equilibria, are permitted by this invention. The time required to effect the radiochemical reaction depends upon the particular reaction involved and the degree of reaction desired.

The amount of (n,α) material added is dependent upon the neutron flux, and more particularly the concentration of the material in the reaction mixture is inversely related to the neutron flux. This relationship can be expressed as follows:

$$C = \frac{K}{F_n}$$

where C represents the concentration of (n,α) isotope expressed in weight percent in the reaction mixture, $F_n$ represents the neutron flux expressed as neutrons/cm.²/sec., and K represents a factor expressing the relationship between C and $F_n$. It is desired that K have a value in the range of $10^8$ to $10^{14}$, preferably $10^{11}$ to $10^{13}$ for boron[10], and values in the range of $5 \times 10^8$ to $5 \times 10^{14}$, preferably $5 \times 10^{11}$ to $5 \times 10^{13}$ for lithium 6.

Preferably the concentration of boron in the reaction mixture is about 0.001 to 1.0% by weight based on the total reaction mixture, and the concentration is 0.001 to 5.0 weight percent for lithium. Lesser or greater concentrations can be employed if desired. These concentrations refer to the concentration of the element per se.

The drawing attached to and forming a part of this specification serves to schematically illustrate this invention.

In the drawing, a hydrocarbon material, for example, a distillate gas oil, is introduced into the process by line 1. A (n,α) material, existing as a compound that is soluble in the gas oil supplied by line 2, is mixed with the gas oil. The mixture is then exposed to neutron radiation in radiation source 3 which comprises, for example, a nuclear reactor, either heterogeneous or homogeneous. The irradiated material is transferred by line 4 to a separation zone 5, wherein the products are separated. This separation zone can comprise means for recovering the (n,α) compound, or solution thereof, such as by distillation, ion exchange filtration, and adsorption. The (n,α) material so recovered can be recycled by line 6 if desired. This separation zone may also include means for separating the hydrocarbon products to obtain the desired product fractions. Thus, with a gas oil feed, distillation or absorption, as with molecular sieves, can be used. Hydrocarbon material, or a portion thereof, from the separation can be recycle to line 1 by line 7, if desired.

Separation zone 5 may also include means for removing and/or neutralizing radioactive waste products. Such means may include, for example, storage tanks to permit decay of radioactivity, distillation columns, solvent extraction units and ion exchange beds.

The finished product is removed from the process by line 8.

The invention will be more fully understood by reference to the following examples.

EXAMPLE 1

In this example, three different petroleum oils were subjected to irradiation in an atomic pile. The three oils employed were as follows:

Oil A

Oil A was a narrow boiling virgin gas oil distilled from paraffinic South Louisiana crude. It had a 30.7° API gravity, bromine number of 1.25 centigrams per gram; 34.4 SSU viscosity at 210° F., viscosity index of 67, and a 0.14 weight percent surfur content.

Oil A had the following distillation characteristics:

| Cuts:[1] | Vol. percent |
|---|---|
| 430°–600° F | 4.7 |
| 600°–700° F | 85.4 |
| Above 700° F | 9.9 |

[1] At atmospheric pressure.

Oil B

Oil B was a narrow boiling naphthenic virgin gas oil distilled from West Texas crude. It had a 31.1° API gravity, a bromine number of 2.47 centigrams per gram, 33.0 SSU viscosity at 210° F., viscosity index of 77, and 1.5 weight percent sulfur content.

Oil B had the following distillation characteristics:

| Cuts:[1] | Vol. percent |
|---|---|
| 430°–600° F | 12.6 |
| 600°–676° F | 85.1 |
| Above 676° F | 2.3 |

[1] At atmospheric pressure.

Oil C

Oil C was a narrow boiling highly aromatic phenol extract from a catalytic cycle stock (560/700° F.) obtained by cracking a heavy West Texas gas oil. This extract consisted predominantly of fused ring aromatic compounds (95% polynuclear aromatics) and had a sulfur content of about 3 weight percent.

Oil C had the following distillation characteristics:

| Cuts:[1] | Vol. percent |
|---|---|
| 430°–600° F | 5 |
| 600°–700° F | 90 |
| Above 700° F | 5 |

[1] At atmospheric pressure.

The atomic pile employed was the air-cooled natural uranium, graphite-moderated research reactor of the Brookhaven National Laboratories.

This pile was operating at a total power of 24 megawatts at the time of these experiments. The flux distribution at the point where the oils were irradiated was:

Slow neutron flux (.03 ev.) = $2.5 \times 10^{12}$ neutrons/cm.$^2$/sec.
Fast neutron flux (>1 mev.) = $0.5 \times 10^{12}$ neutrons/cm.$^2$/sec.
Gamma intensity = $1.7 \times 10^{6}$ roentgens/hr.

The core of the reactor was approximately a 20 ft. x 20 ft. x 20 ft. lattice of graphite with horizontal 1-inch diameter aluminum-clad uranium rods spaced evenly throughout the reactor extending from the north to south faces of the core. This core was completely surrounded by 5 ft. of concrete shielding. The sample holes used for irradiation were horizontal 4 inch by 4 inch square holes extending through the 5 ft. concrete shield and into the carbon core for a distance of 10 ft. from the core face. Normal operating temperatures in the experimental hole were from 250° to 400° F.

Two samples of each of the three oils described above were irradiated in this atomic pile. One of the samples of each oil contained no boron, whereas the parallel sample contained a small amount of tri-n-dodecyl borate dissolved in the oil. The element was present at a concentration of 0.1 weight percent based on the oil. The irradiations were carried out as follows:

Three one-quart samples were irradiated at one time by placing them in three vented 3" diameter aluminum containers which were mounted on a horizontal aluminum sled. The vents of aluminum tubing extended from the vapor space in the containers out of the core and through the shielding to a sample receiver system where gases and condensable liquids could be metered and collected. The samples were inserted in the pile during scheduled shutdowns, irradiated for periods of 10 days, and were then withdrawn from the pile during the following shutdown.

The results of the irradiations were as follows:

| Products | Weight percent of feed | | | | | |
|---|---|---|---|---|---|---|
| | Oil A | | Oil B | | Oil C | |
| | Ex. boron | With boron | Ex. boron | With boron | Ex. boron | With boron |
| Wet gas | 3.8 | 16.3 | 4.3 | 16 | 0 | 24.4 |
| Liquid | 96.2 | 2.0 | 95.7 | 5.0 | 100 | 0.3 |
| Solid (polymer) | 0 | 81.7 | 0 | 89 | 0 | 75.3 |

The analyses of the wet gases were as follows:

| Gas composition, mole percent | Oil A | | Oil B | |
|---|---|---|---|---|
| | Ex. boron | With boron | Ex. boron | With boron |
| (1) Hydrogen | 84 | 88 | 78 | 88 |
| (2) Hydrogen-free hydrocarbons | 16 | 12 | 22 | 12 |
| $C_1$ | 19 | 22 | 18 | 27 |
| $C_2$ | 32 | 53 | 31 | 47 |
| $C_3$ | 17 | 16 | 18 | 15 |
| $C_4$ | 17 | 6 | 18 | 6 |
| $C_5$ | 11 | 3 | 10 | 3 |
| | 100 | 100 | 100 | 100 |
| Olefin to paraffin ratios: | | | | |
| $C_2$ | 3.2 | 6.3 | 2.5 | 5 |
| $C_3$ | 1.9 | 3.0 | 2.0 | 3 |
| $C_4$ | 1.6 | 1.5 | 1.3 | 1 |
| $C_5$ | 1.0 | 0.7 | 1.0 | 0.8 |

Note.—The wet gas sample from oil C became contaminated due to air leakage and was not analyzed.

The data reported in the above tables show that the soluble (n,α) material greatly increased the conversion of liquid feeds to both gas and polymer, when present in hydrocarbons irradiated in a nuclear reactor. This is important in one respect because it allows the use of much shorter irradiation times to get the desired conversion of feed stock to products.

With oils A and B, about 4% of the feed was converted to gas without boron and no solid polymers were formed. However, when boron was present during the irradiation, the production of gas was increased fourfold (to 16%) and almost all the rest of the product was a brittle, hard solid polymer.

In the case of oil C, the results are even more striking. Without boron, the oil was completely unconverted by pile irradiation for 10 days. By irradiation in the presence of only 0.1 weight percent boron, essentially all of the feed was converted to gas (24%) and solid polymer (75%). This means that boron accelerated the reaction rate of a material resistant to 10 days of irradiation, enough so that it could be converted to other products in a practical irradiation time. It will be understood that shorter periods of time can be employed to effect lesser degrees of conversion.

The above results show that the presence of (n,α) materials during pile irradiation of petroleum fractions is very effective in increasing reaction rates in general and the present invention can be used effectively for many types of petroleum conversions. Some examples of particular interest are: (1) dehydrogenation of $C_3$ and $C_4$ paraffins to make olefins for chemical raw materials; (2) dehydrogenation of light naphtha for octane improvement; (3) polymerization of virgin petroleum fractions to form lubes, adhesives, and resins; (4) cracking of heavy gas oils and residua to form fuels; (5) cracking of hydrocarbons, e.g., methane, to form hydrogen; (6) alkylation of paraffins to form fuels and lubes; (7) desulfurization and removal of other contaminates from petroleum crudes or fractions; and (8) polymerization of paraffins and/or olefins to form fuels and lubes.

Having described this invention, what is sought to be protected by Letters Patent is succinctly set forth in the following claims.

What is claimed is:

1. In a process wherein a liquid hydrocarbon is converted by irradiaiton with neutrons from a nuclear reactor at a neutron flux above $10^{11}$ n/cm.$^2$/sec. in the reaction zone; the improved method of accelerating the reaction which comprises admixing with the liquid hydrocarbon undergoing irradiation a soluble compound of boron dissolved in a liquid carrier, said boron containing approximately 19 weight percent of the isotope boron 10, the concentration of the said boron in said liquid hydrocarbon, based on total reaction mixture, being in the range of 0.001 to 1.0 weight percent and at least 10 percent of the energy absorbed by said liquid hydrocarbon being attributable to the nuclear conversion of said boron 10.

2. The process of claim 1 wherein said liquid carrier is said liquid hydrocarbon undergoing conversion.

3. The process of claim 1 wherein said liquid hydrocarbon is a petroleum fraction boiling in the range of 450° to 1200° F.

4. In a process wherein a liquid hydrocarbon is converted by irradiation with neutrons from a nuclear reactor at a neutron flux above $10^{11}$ n/cm.$^2$/sec. in the reaction zone; the improved method of accelerating the reaction which comprises admixing with the liquid hydrocarbon undergoing conversion a soluble compound of an element dissolved in a liquid carrier, said element containing an appreciable amount of an isotope having a slow neutron capture cross-section of at least 100 barns and capable of undergoing the (n,α) reaction, and producing a decay alpha particle having an energy of at least 0.1 mev., the concentration of said element in said liquid hydrocarbon being in the range of 0.001 to 5.0 weight percent and at least 10 percent of the energy absorbed by said liquid hydrocarbon being attributable to said (n,α) reaction.

5. In a process wherein a liquid petroleum fraction boiling in the range of 450° to 1200° F. is converted by irradiation with neutrons from a nuclear reactor at a neutron flux of above $10^{11}$ n/cm.$^2$/sec. in the reaction zone; the improved method of accelerating the reaction which comprises admixing with said liquid petroleum fraction an oil soluble compound of an element that contains an appreciable amount of an isotope material having a slow neutron capture cross-section of at least 100 barns and being capable of undergoing the (n,α) reaction and producing decay alpha particles having an energy of at least 0.1 mev.; the weight percent concentration of said isotope in said reaction mixture being equal to $K/F_n$ wherein $F_n$ represents the neutron flux in said reaction zone expressed in n/cm.$^2$/sec., and K is a constant having a value in the range of $10^8$ to $10^{14}$, and at least 10 percent of the energy absorbed by said liquid petroleum fraction being attributable to said (n,α) reaction.

6. A hydrocarbon conversion process which comprises irradiating a liquid hydrocarbon containing dissolved therein to accelerate the reaction an oil soluble compound of an isotope having a slow neutron capture cross-section of at least 100 barns and capable of undergoing the (n,α) reaction and producing a decay alpha particle having an energy of at least 0.1 mev.; the irradiation comprising neutrons from a nuclear reactor and the neutron flux in said liquid hydrocarbon being at least $10^{11}$ n/cm.$^2$/sec., the weight percent concentration of said isotope in said liquid hydrocarbon being equal to $K/F_n$ wherein $F_n$ represents the neutron flux in said liquid hydrocarbon expressed as n/cm.$^2$/sec., and K is a consant having a value in the range of $10^8$ to $10^{14}$, and at least 10% of the energy absorbed by said liquid hydrocarbon being attributable to said (n,α) reaction.

7. The process of claim 6 wherein a majority of said neutrons are slow neutrons having an energy less than 100 ev.

8. The process of claim 6 wherein said isotope is boron 10 and said oil soluble compound is a compound of naturally occurring boron containing about 19 weight percent of boron 10, the concentration of boron in said liquid hydrocarbon being in the range of 0.001 to 1.0 weight percent.

References Cited in the file of this patent

UNITED STATES PATENTS 2,743,223   McClinton _____ Apr. 24, 1956

OTHER REFERENCES

Davidson: "Jour. of Applied Physics," vol. 19, pages 427–433, May 1948.

Davidson et al.: Atomic Energy Commission Document MDDC–1449, 14 pages, declassified Nov. 12, 1947.